UNITED STATES PATENT OFFICE 2,317,378

ANTISEPTIC MATERIALS

Benjamin R. Harris, Chicago, Ill.

No Drawing. Application February 5, 1941,
Serial No. 377,488

22 Claims. (Cl. 167—22)

This invention relates to antiseptic, medicinal, preservative, bactericidal, bacteriostatic, germicidal and fungicidal materials and compositions.

It has been found that certain materials, hereinafter described in detail, possess antiseptic, medicinal, preservative, bacteriocidal, germicidal and fungicidal properties (hereinafter generically referred to as antiseptic materials) to a marked degree and are substantially non-toxic toward even highly delicate animal tissue.

At least many of the antiseptic materials of the present invention, generally used in the form of their salts, may be regarded as higher molecular weight alcohol poly-esters of amino-polycarboxylic acids, particularly higher molecular weight aliphatic alcohol di-esters of aliphatic primary amino-dicarboxylic acids.

In order that the nature of the invention may become more apparent, there are listed hereinbelow various of the novel antiseptic materials which generally are used in the form of salts, especially, hydrochlorides, and fall within the scope of the invention:

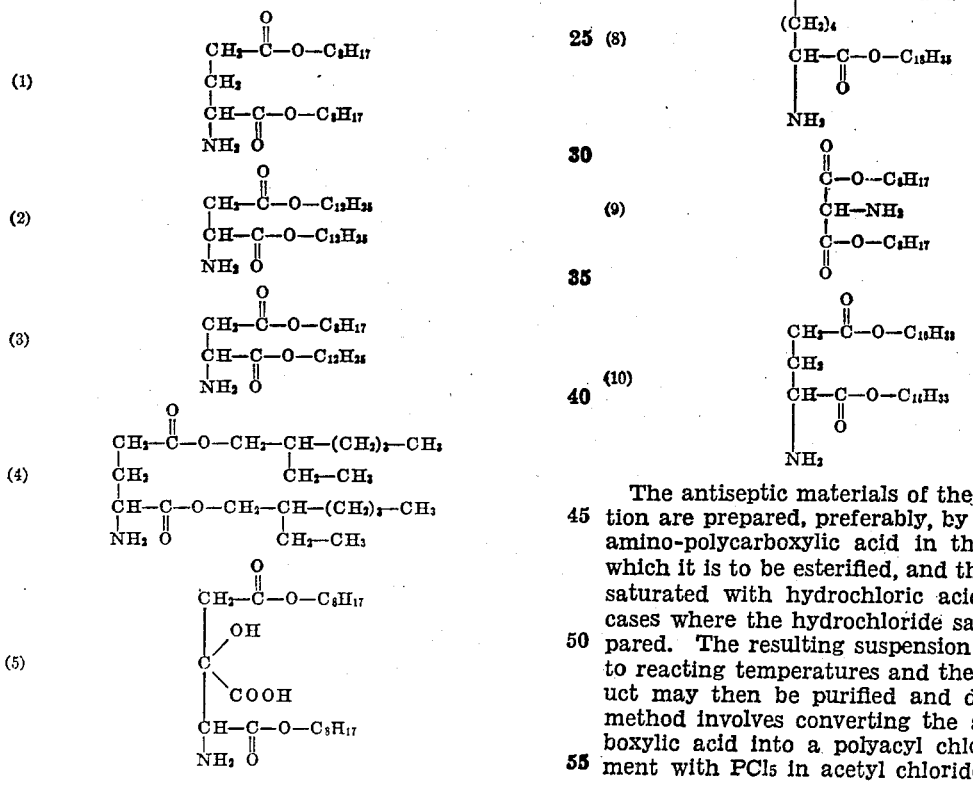

The antiseptic materials of the present invention are prepared, preferably, by suspending the amino-polycarboxylic acid in the alcohol with which it is to be esterified, and the suspension is saturated with hydrochloric acid gas in those cases where the hydrochloride salt is to be prepared. The resulting suspension is then heated to reacting temperatures and the reaction product may then be purified and dried. Another method involves converting the amino-polycarboxylic acid into a polyacyl chloride by treatment with PCl₅ in acetyl chloride solution, and reacting the polyacyl chloride of the amino acid with the stoichiometric equivalent of the higher molecular weight alcohol. Still other methods will readily occur to those skilled in the art in the light of the teachings and disclosures contained herein.

The following examples are illustrative of a method which has been found suitable for preparing the various antiseptic materials which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

Example A 14.7 grams of glutamic acid were suspended in 100 cc. of n-hexanol and the resulting suspension was saturated with hydrochloric acid gas. 12 cc. of chloroform were then added and the mixture was refluxed at 90 degrees C.–95 degrees C. for 5 hours although solution was complete after the first 15 to 20 minutes. The resulting solution was then allowed to stand for 24 hours over calcium chloride. It was then largely freed of excess n-hexanol by distillation at 100 degrees C., under reduced pressure, while passing a stream of gaseous carbon dioxide through the solution. The residue was a viscous substance, soluble in water to form clear solutions. The product was also soluble in the common organic solvents such as alcohol, ether, ligroin, chloroform and the like.

Analyses of the product showed that, on a weight basis, it contained 86% of n-hexanol diester of glutamic acid hydrochloride. Determined on an analysis of the chlorine content, it largely excess n-hexanol.

The product was then heated further to 150 degrees C. under reduced pressure in order to drive off more of the excess n-hexanol. The remaining product was a water-soluble, glassy appearing material consisting largely of n-hexanol diester of glutamic acid hydrochloride and having the formula

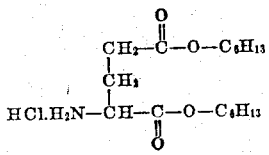

Example B

The n-octyl alcohol diester of glutamic acid hydrochloride was prepared in exactly the same manner as described in Example A with the exception of using n-octyl alcohol in place of n-hexanol. The yields were substantially the same. The product was a cream-colored, waxy solid, soluble in water, alcohol, ether, ligroin and chloroform.

Example C

Hydrochloric acid gas was bubbled through 100 grams of n-octyl alcohol until approximately 4.5 grams of the hydrochloric acid gas were dissolved therein. 20 grams of l-aspartic acid were added and hydrochloric acid gas was again bubbled through the mixture until the increase in weight was 7 grams. 15 cc. of chloroform were added and the mixture was heated in an oil bath at 80–90 degrees C. for about two hours, at the end of which time all of the solid material had dissolved. The heating was then continued for four more hours at about 90–95 degrees C. The water layer, which separated, was removed by allowing the mixture to stand with calcium chloride. The product obtained was dissolved in hexane and filtered. The solvent and excess octyl alcohol were then distilled from the filtrate, under reduced pressure, at temperatures up to 145 degrees C. The residue, which solidified on cooling, was crystallized from acetone, washed with petroleum ether, and dried.

The yield of the crystallized product, which had a melting point of 101 degrees C.–102 degrees C., was 21 grams. The product, which was soluble in water, and had a slight astringent, bitter taste, but which did not manifest itself immediately nor did it persist, consisted essentially of di-n-octyl aspartate hydrochloride having the formula:

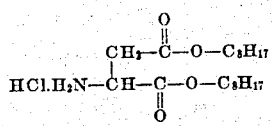

The higher molecular weight alcohols which are utilized in the preparation of the novel antiseptic materials of the present invention may be selected from a large group including aliphatic straight chain and branched chain alcohols such as octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, high molecular weight glycols such as cetene glycol and other vicinal glycols; 1,10 dihydroxyoctadecene, 1,10 dihydroxyoctadecane, and the like; branched chain octyl, decyl, dodecyl, tetradecyl, hexadecyl and octadecyl aliphatic alcohols as, for example, 2-ethyl hexanol-1; 2-n butyl octanol-1; 2-butyl tetra-decanol-1; 7 ethyl 2-methylundecanol-4; 3,9 diethyltridecanol-6; 3-methylheptanol-2; 5,11 diethylpentadecanol-8; 5-ethylnonanol-2; 7-ethyl-2 methylundecanol-4; 9-ethyl-5-methyltridecanol-6; 5-ethyltridecanol-8; 3-ethylheptanol-6; 3-ethyl-8-methylnonanol-6; 3-ethylundecanol-6; 2-methylnonanol-4; and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 8 to 14 carbon atoms being especially preferred. Other alcohols which may be employed are the cyclo aliphatic or alicyclic alcohols such as the sterols, as, for example, cholesterol, isocholesterol, phytosterol, sitosterol, aromatic and hydroaromatic alcohols such as abietol, benzyl alcohol, naphthyl alcohol, cinnamyl alcohol, and such unsaturated alcohols as linalool, citronellol, geraniol and the like and hydrogenated products of the foregoing.

It is, of course, obvious that the alcohols from which the antiseptic materials disclosed herein may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols may be utilized in the preparation of the antiseptic materials as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$. Again, mixtures of alcohols such as are present in the so-called sperm oil alcohols, as well as those present in wool-fat, may efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the antiseptic materials may be prepared from a single, substantially pure alcohol.

Of particular utility are the unsubstituted aliphatic or fatty alcohols containing from eight to fourteen carbon atoms.

The amino-poly-carboxylic acids which are or may be utilized in the preparation of the antiseptic materials include, among those previously mentioned and others, amino succinic acid, amino glutaric acid, amino citric acid, amino malonic acid, amino adipic acid, amino sebacic acid, and the like; the amino polycarboxylic acids or mixtures thereof obtained by the hydrolysis of proteins or protein-containing materials such as gluten, soya bean flour and the like, whether by enzymatic action, by acids or by any other means. It will be understood that mixtures of any two or more of the foregoing or other amino-polycarboxylic acids may be utilized in the preparation of the antiseptic materials of the present invention. It will also be understood that any of these amino polycarboxylic acids may be esterified with any of the higher molecular weight alcohols disclosed hereinabove.

As indicated hereinabove, the antiseptic materials are best used in the form of salts, preferably in the form of substantially neutral salts or at a pH of about 6.7. The hydrochlorides are especially satisfactory but other salts may be employed, in certain instances, such as the sulphates, phosphates, nitrates, hydrobromides, hydriodides, propionates, gluconates, sulphoacetates, sulphosuccinates, lactates, tartrates, citrates, salts of amino-carboxylic acids, and the like. The free esters of the amino-carboxylic acids generally possess limited solubility in water and, for that reason, the esters are used in the form of their salts, the salts possessing substantially greater water solubility. It is, however, within the broader scope of the invention to employ the free esters, using solvent media other than water or water alone, or by solubilizing the esters in any desired manner.

It will be understood that the numerous antiseptic materials disclosed herein will vary somewhat in bactericidal, germicidal, bacteriostatic, antiseptic and fungicidal power or potency and that the effects will also vary depending upon the environment in which the antiseptic materials are used. The compounds are employed particularly in dilute aqueous or modified aqueous solutions, usually on the order of 0.1% to several thousandths of 1%. They may be used internally or externally and either as such or in conjunction with other agents having bactericidal, germicidal, antiseptic or like action. Particularly satisfactory use is in connection with dentifrices such as tooth pastes, tooth powders, liquid dentifrices, and mouth washes. In such cases, the proportions of the salts of the esters may, if desired, be somewhat higher than those set forth hereinabove. Their especial utility in dentifrices resides not only in the fact that they possess bactericidal, germicidal, and similar properties but, in addition, they are innocuous, non-toxic and relatively tasteless.

Among the bacteria, the metabolism of which is strongly inhibited by many of the compounds of the present invention, are the following: *Staphylococcus aureus, Staphylococcus albus, Sarcina lutea, Micrococcus tetragenus, Bacilli coli, Aerobacter aerogenes, Ps. pyocyaneus, Proteus vulgaris*. Many of the antiseptic materials are also effective against pneumococcus. In addition, the phenol coefficients of many of them are substantially higher than that of phenol.

The term "higher," as used herein and in the claims to describe alcohols, will be understood to mean at least eight carbon atoms unless otherwise specifically stated.

While the invention has been described in detail, it is to be understood that the scope thereof is not to be limited other than is set forth in the claims.

What I claim as new and desire to protect by Letters Patent of the United States is:

1. Antiseptic materials comprising higher molecular weight aliphatic alcohol poly-esters of aliphatic amino poly-carboxylic acids.

2. Antiseptic materials comprising higher molecular weight alcohol di-esters of aliphatic primary amino di-carboxylic acids.

3. Antiseptic materials comprising higher molecular weight aliphatic alcohol di-esters of aliphatic primary amino di-carboxylic acids.

4. Antiseptic materials comprising salts of higher molecular weight aliphatic alcohol di-esters of aliphatic amino poly-carboxylic acids.

5. Antiseptic materials comprising hydrochlorides of higher molecular weight aliphatic alcohol di-esters of aliphatic primary amino di-carboxylic acids.

6. Antiseptic materials comprising hydrochlorides of higher molecular weight straight chain aliphatic alcohol di-esters of aliphatic amino poly-carboxylic acids.

7. Antiseptic materials comprising inorganic acid salts of n-octyl alcohol di-esters of aliphatic amino di-carboxylic acids.

8. Antiseptic materials comprising hydrochlorides of octyl alcohol di-esters of aliphatic primary amino di-carboxylic acids.

9. Antiseptic materials comprising salts of octyl alcohol di-esters of glutamic acid.

10. As an antiseptic material the hydrochloride of n-octyl alcohol di-esters of glutamic acid.

11. Antiseptic materials comprising octyl alcohol di-esters of aliphatic primary amino di-carboxylic acids.

12. Antiseptic materials comprising salts of octyl alcohol di-esters of aliphatic primary amino di-carboxylic acids.

13. Antiseptic compositions comprising dilute aqueous solutions of salts of higher molecular weight branched chain aliphatic alcohol di-esters of aliphatic amino di-carboxylic acids.

14. Antiseptic materials comprising salts of higher molecular weight branched chain aliphatic alcohol di-esters of aliphatic primary amino di-carboxylic acids.

15. Antiseptic materials comprising hydrochlorides of higher molecular weight branched chain aliphatic alcohol poly-esters of aliphatic amino poly-carboxylic acids.

16. Antiseptic materials comprising hydrochlorides of higher molecular weight branched chain aliphatic alcohol di-esters of aliphatic primary amino di-carboxylic acids.

17. Antiseptic materials comprising aqueous solutions of salts of higher molecular weight alcohol poly-esters of primary aliphatic amino poly-carboxylic acids.

18. Antiseptic materials comprising aqueous solutions of salts of higher molecular weight aliphatic alcohol di-esters of aliphatic primary amino di-carboxylic acids.

19. Antiseptic compositions comprising dilute aqueous solutions of salts of higher molecular weight aliphatic n-alcohol di-esters of aliphatic primary amino di-carboxylic acids.

20. Antiseptic materials comprising hydrochlorides of octyl alcohol di-esters of aliphatic primary amino di-carboxylic acids.

21. Antiseptic materials comprising hydrochlorides of lauryl alcohol di-esters of aliphatic primary amino di-carboxylic acids.

22. Antiseptic compositions comprising dilute aqueous solutions of hydrochlorides of higher molecular weight aliphatic alcohol di-esters of aliphatic primary amino di-carboxylic acids.

BENJAMIN R. HARRIS.